3,496,812
PLASTIC CUTTING DEVICE AND METHOD
Kenneth N. White, 7225 W. 110th, Worth, Ill. 60482, and Harold E. Meyer, 82nd Ave. and Forestview Drive, Orlean Park, Ill. 60462
Filed May 13, 1968, Ser. No. 728,711
Int. Cl. B26d 1/00, 3/00
U.S. Cl. 83—13                                                                12 Claims

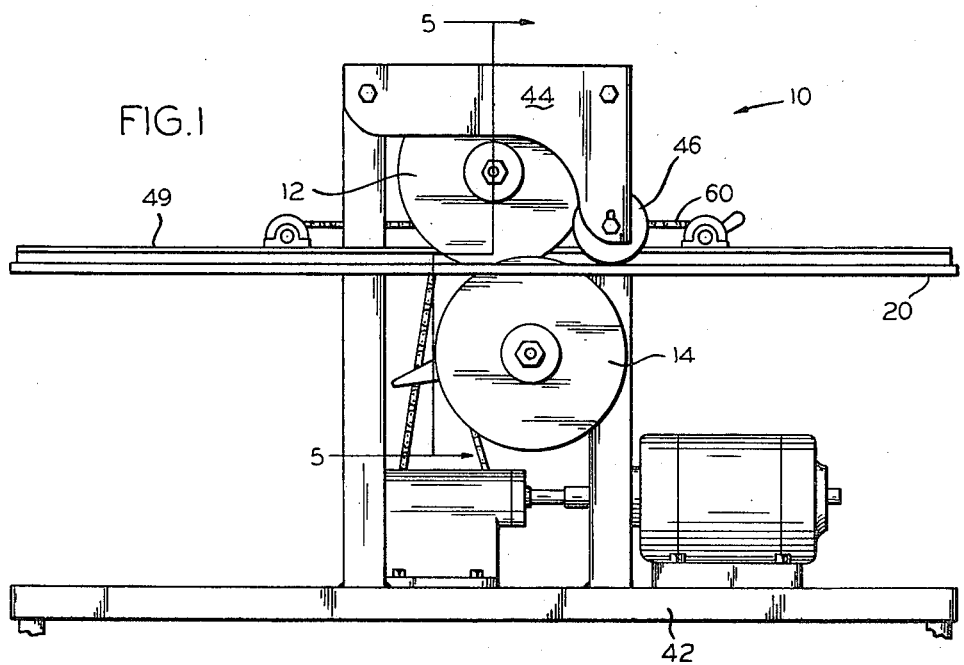
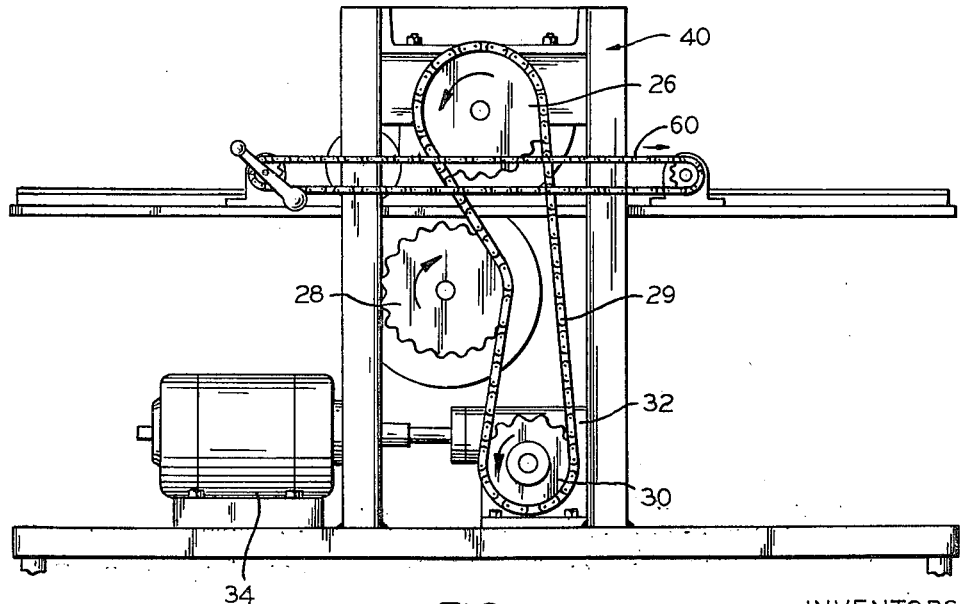

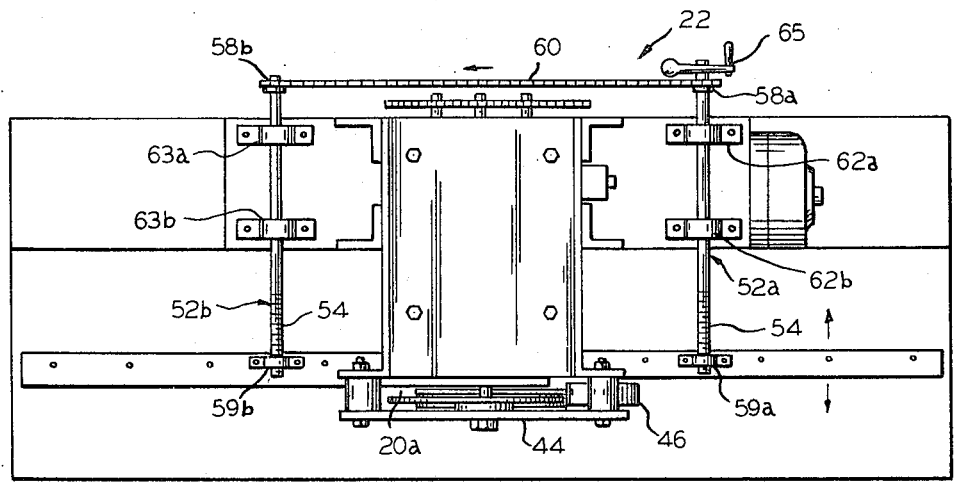
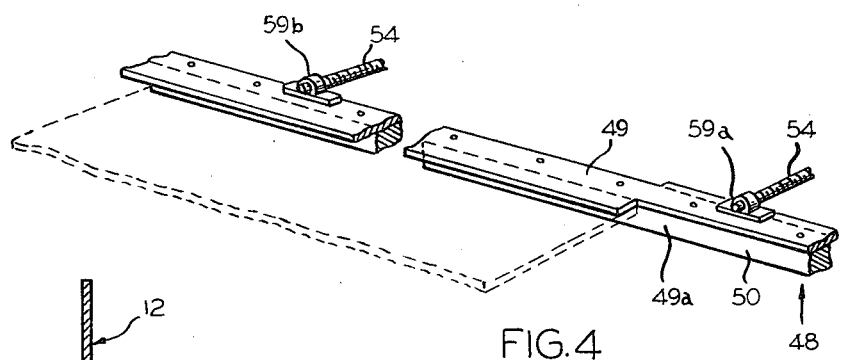
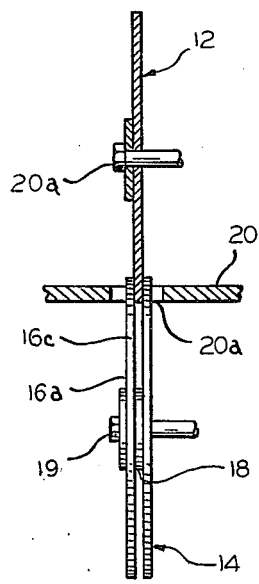
INVENTORS
KENNETH N. WHITE
HAROLD E. MEYER
BY *Alter and Weiss*
ATTORNEYS United States Patent Office 3,496,812
Patented Feb. 24, 1970

ABSTRACT OF THE DISCLOSURE

Includes upper and lower cutters mounted with relation to a table and guide means to cleanly slit plastic materials, or the like, by means of the method of deforming the plastic between the cutters.

This invention relates to cutting devices and improved process relating thereto, and more particularly, to a slitting device and process for use in connection with severing products, such as plastic, wherein it has heretofore been necessary to deburr or smoothly finish the remaining severed edges after the plastic has been severed.

It is therefore a primary object of this invention to provide a new and improved plastic slitter where the cut or slit edges of the plastic do not require an extra refinishing step or operation.

Heretofore, in cutting or slitting plastics, problems arose regarding resultant wear on the teeth of the costly carbide blades, which have customarily been used for cutting plastics. Thus, not only did the cutting and slitting of the plastics have the disadvantage of requiring an extra operation for deburring or refinishing the cut edges, but also there was a problem of continually wearing down the carbide blades. This invention obviates the need for using carbide blades, and provides an answer to the long existing problem of continually replacing the carbide blades by providing a pair of cutters that deform the plastic by having the cutters form a die therebetween through which it is intended to force said plastic sheet and thereby deform the plastic to a point where it severs and the cutters do not require cutting teeth. Consequently, the cutters last longer and do not have to be replaced as often.

Thus, it is a further object of our invention to provide a new and improved plastic slitter and process that is economical, not only from the standpoint of eliminating further finishing steps, but also from the standpoint that the blades employed are not as costly as the prior carbide blades; and also, they can absorb wear and tear in a better fashion than the prior carbide blades due to less wear and tear on the tools being used.

Still an even further disadvantage with the prior carbide blades results from large amounts of heat and friction being generated when cutting. This heat and friction slows the process, in addition to wearing down the blades. This device and process reduces the heat and friction resulting from the cutting operation, and thereby speeds up the slitting process. It is thus even a still further object of this invention to provide a new and improved means and method which can accomplish the severing operation faster and with less wear and tear than cutters employing the prior art carbide blades.

Other and further objects of this invention will become more readily apparent from reading the description in connection with the accompanying drawings, wherein:

FIGURE 1 is a front side elevational view of a device employing the new and improved device used in practicing the invention;

FIGURE 2 is a rear elevational view of FIG. 1;

FIGURE 3 is a plane view of the device of FIGS. 1 and 2;

FIGURE 4 is an enlarged fragmentray view of the guiding means used in the device; and FIGURE 5 is a view taken along a plane passing through the line 5—5 and looking in the direction of the arrows in FIG. 1.

Referring to the drawings wherein like characters of reference indicate corresponding parts throughout, the new and improved plastic slitter is referred to generally by the character reference 10, and it includes an upper cutter 12 and a lower cutter 14, that are rotatably mounted on an arbor 40, which in turn supports a table surface 20, as well as the adjustable guide means 22 as will be more fully explained hereafter. Driving means for the cutters includes a motor 34 which has its central shaft 34a attached to a speed reducer 32, which in turn drivingly associates a pinion gear 30 with the motor 34. The pinion gear 30 is drivingly associated with the upper and lower cutters 12, 14 by means of the first and second sprocket means 26, 28 that are illustrated in FIGS. 2 and 3 as being rigidly attached to the cutters 12 and 14.

A base 42 supports the arbor 40, which in turn supports the table 20 and a shield 44 that is attached to the arbor at the top thereof and covers the upper cutter 12, as seen from FIG. 1. Also attached to the shield 44 at the lower end thereof is roller 46 which keeps the severed plastic flush against the table 20 prior to the plastic being severed. The table 20 has an opening 20a formed therein so that the upper and lower cutters 12, 18 can intermesh and cooperate together in the opening as illustrated in FIG. 5.

The adjustable guide means 22 includes adjustment sprockets 58a, 58b, which are rigidly associated with respect to adjustment screws 52a, 52b, that have threads 54 formed thereon. The adjustment screws are threadedly associated with the threaded adjustment brackets 59a, 59b, that are in turn attached to the top leg 49 of an L-shaped bracket 48 which also has a bottom leg 50 that rests on the table top 20 and is slidably associated therewith.

A hand lever 65 is attached to one of the adjustment screws 52a, as illustrated in FIG. 3. Thus, when the hand lever 65 is rotated in either direction, the L-shaped bracket 48 is either advanced or retracted thereby enabling different sizes of plastic to be cut by adjusting the L-shaped bracket at different distances with respect to the cutters. With the adjustment means provided, the L-shaped bracket 48 can be advanced or retracted in equal amounts parallel to the cutters and table due to the fact that the chain is connecting the two sprockets 58a, 58b, thereby enabling the adjustment screws to be rotated equal amounts by rotation of the hand lever 65. It will be noted that the L-shaped bracket has an opening 49 so that when it is in the operative position as illustrated in FIG. 1, the roller 46 protrudes downward therethrough to hold the plastic so that it does not move vertically prior to the same being cut by the cutters 12 and 14. After the plastic has been cut by the cutters 12 and 14, the upper leg 49 prevents the plastic from moving upward vertically.

It will be noted from the drawings that the upper cutter 12 is a circular disc having a smooth periphery which is journaled for rotatable motion on the arbor, and it is driven by the sprocket 26, as illustrated in FIG. 2. On the other hand, the lower cutter includes a pair of spaced apart circular discs 16a, 16b, which are attached together and spaced apart by means of the spacer or separator 18. The discs are rigidly associated with the shaft 19a and lock means 19, which are in turn connected to the second sprocket means 28. All three of the sprockets, namely 30, 26 and 28, are associated with and cooperate with one another by means of a chain 29 which is associated with the gears in a manner illustrated in FIG. 2 and they form a die to deform a plastic sheet upon passage through the die when the lower cutter and upper cutter are caused to rotate in opposite directions viz.: clockwise and counterclockwise, as illustrated in FIG. 2. Still further, it will be noted that the axes of rotation of the two cutters are off center with the lower cutter being preferably shown as leading the upper cutter as illustrated in FIG. 1. Thus, while the axes of rotation of the cutters are in parallel alignment and in the same plane, they are not in the same vertical plane. It will be noted further that the upper and lower cutters intermesh to form a die so that when the plastic sheet is extruded therethrough the plastic is deformed and forced between the space 16c of the cutter 16, by means of pressure from the upper cutter 12, whereupon the plastic is deformed to a point where it is severed upon passing through the die between the cutters. The amount of deformation of the plastic is directly dependent on the intermeshing between the upper and lower cutters which can be adjusted by merely varying the space between the axis of the cutters. While adjusting means of this type is not illustrated, any well known manner of changing the distance between the two axes will suffice for the purposes of explaining this invention. Thus, with this type of arrangement, different types of plastic which might require different amounts of intermeshing between the cutters to thereby deform and sever the plastics in accordance with the method and structure illustrated. For instance, where the plastic has greater ductility greater deformation of the plastic is needed, and therefore, intermeshing of the cutters to a greater degree would be required.

Also, different size separators or spacers may be required for different materials. Thus, the cutters would have to be adjusted in accordance with the material being used.

Having thus described the invention, it will be manifest to those skilled in the art that the new and improved invention fulfills the objects stated herein in a remarkably unexpected fashion. Economical slitting or severing of plastic is accomplished in a quicker and more expedient manner with the device because instead of using carbide tools, longer wearing metal discs which do not have teeth may be employed as cutters. In operation, a piece of plastic is placed on the table 20 of our device and the first step is to measure the amount of plastic which is needed for severance. When this is determined, the adjustable guide means can be moved into a position where such a piece can be cut by means of turning the hand lever 65 which retracts the L-shaped bracket 48 in equal amounts. Thereafter, the machine is actuated and the plastic is advanced along the table by hand through the roller 46 until it contacts the cutters, while still being held flush to the side of the lower leg 50 of the guide means 48. The plastic contacts the periphery of the lower cutter 16 and rides therealong until the sheet contacts the upper cutter 12 whereupon the plastic sheet is deformed and severed upon passage through the die by being forced into the space 16c between the discs of the lower cutter 16. The plastic is deformed to a point as described hereinabove where it is severed and the upper leg 49 of the L-shaped bracket precludes vertical rising of the plastic after it has been cut because the plastic contacts the upper leg after being cut. After the plastic contacts the cutters, it is drawn through the machine by the cutters and need merely be guided against the leg 50 as it is drawn through the machine.

It should be appreciated that while we have described and illustrated a preferred embodiment of our invention in connection with specific apparatus, it is to be clearly understood that this description is made only by way of example, and not as a limitation on the scope of our invention.

Thus, having described the invention, we claim:
1. A plastic cutting device comprising:
means for supporting plastic thereon,
a pair of cutters mounted to receive said plastic therebetween,
one of said cutters being a single disc having a smooth periphery,
the other of said cutters including a pair of spaced apart discs,
said one of said cutters having a portion received and disposed in the space between said spaced apart discs to form a die between said cutters, and
means for rotatably driving both of said discs in opposite directions,
whereby plastic can be moved along said means for supporting said plastic through said die formed in between said cutters to cut said plastic by deforming it between said one cutter and said other cutter having said spaced apart discs.

2. A plastic cutting device as defined in claim 1 wherein an adjustable guide means is provided to guide the plastic so it can be cut at a predetermined location, and said means for supporting plastic thereon including table means, whereby said plastic can be slid along said table and guided by said guide means in order that said plastic can be fed to said cutters and severed.

3. A plastic cutting device, as defined in claim 1, wherein the axes of rotations of said cutters are in parallel alignment.

4. A plastic cutting device, as defined in claim 2, wherein the axes of rotation are not in the same vertical plane whereby one of the cutters leads the other one to allow for a gradual deformation and severing of the plastic sheet upon being forced through the die formed between said cutters.

5. A plastic cutting device, as defined in claim 4, wherein said one of said cutters is disposed upward of and substantially opposite to said other cutter.

6. A plastic cutting device, as defined in claim 2, wherein a roller is rotatably associated with said plastic cutting device and disposed to press said plastic against said table as it is fed to said cutters.

7. A plastic cutting device, as defined in claim 2, wherein said guide means is adjustable and has means for moving it predetermined distances in planes parallel to said table and said cutters.

8. A plastic cutting device, as defined in claim 7, wherein said guide means includes an L-shaped bracket that has a top leg and a bottom leg, said top leg is disposed to keep said plastic form rising after it is severed and said bottom leg acts as a guide for the side of said plastic as it is being moved along said table.

9. A plastic cutting device, as defined in claim 8, wherein said guide means includes a pair of threaded members threadedly associated with said L-shaped bracket,
means for actuating both of said threaded members an equal distance,
said threaded members being associated with said L-shaped brackets to move it parallel to said table either toward or away from said cutters,
whereby uniform rotation of said threaded members enables uniform actuation of said guide means.

10. The process of severing a piece of plastic sheet material along an intended line of severance with a pair of rotating cutters,
said cutters being positioned and located with respect to each other to form a die therebetween through which it is intended to force said plastic sheet along said intended line of severance,
said die being shaped to deform said plastic to a degree where severance occurs upon passage through said die,
comprising the steps of:
constrainingly moving the plastic sheet material to be cut in a first plane into contiguous relationship with said cutters, extruding said plastic sheet through said die along said intended line of severance while constrainingly moving it in said first plane, whereby said plastic sheet is deformed and severed upon passage through said die, said horizontal movement of said plastic continuing until each point along the line of severance of said plastic has been forced through said die to accomplish the intended severance of said plastic sheet material.

11. The process of severing a piece of plastic sheet material along an intended line of severance with a pair of oppositely rotating cutters and a means for guiding the plastic sheet so that it can be moved through said cutters along the intended line of severance, said pair of cutters including a first cutter with a pair of spaced apart discs having smooth peripheries, the second of said pair of cutters being a single disc having a smooth periphery with a portion thereof being positioned for rotation between said pair of spaced apart discs of said first cutter;

said cutters forming a die therebetween through which it is intended to force said plastic sheet, said process comprising the steps of:

setting the guiding means so that the plastic can be moved through said die to deform and sever the plastic along a predetermined line of severance, constrainingly moving the plastic sheet material to be cut in a first plane into contiguous relationship with said cutters, extruding said plastic through said die along said intended line of severance while constrainingly moving it in said first plane, whereby said plastic sheet is deformed and severed upon passage through said die by being forced into said space between said discs of said second cutter by the interaction between the relative location and rotation of said first cutter and said second cutter, and continuing movement in said first plane until each point along the line of severance of said plastic has been forced through said die to accomplish the intended severance of said plastic.

12. The improved process of claim 11 wherein the cutters do not have their axes of rotation in vertical alignment, whereby extrusion and severance of said plastic sheet includes the further steps of:

contacting the first of said pair of cutters while the plastic sheet is moved along said first plane whereby said sheet rides on the first of said pair cutters until the sheet comes into contact with the second of said pair of cutters, whereby the plastic sheet is gradually deformed as it is extruded through the die formed by said cutters.

References Cited

UNITED STATES PATENTS

| | | | |
|---|---|---|---|
| 1,860,340 | 5/1932 | Biggert | 83—421 |
| 2,539,401 | 1/1951 | Carl et al. | 83—421 |
| 3,126,780 | 3/1964 | Booth | 83—500 |

FOREIGN PATENTS

| | | |
|---|---|---|
| 1,726 | 5/1874 | Great Britain. |
| 1,069,997 | 5/1967 | Great Britain. |

WILLIAM S. LAWSON, Primary Examiner

U.S. Cl. X.R.

83—20, 176, 421, 492, 500, 664, 675

UNITED STATES PATENT OFFICE
CERTIFICATE OF CORRECTION

Patent No. 3,496,812            Dated February 24, 1970

Inventor(s) KENNETH N. WHITE and HAROLD E. MEYER

It is certified that error appears in the above-identified patent and that said Letters Patent are hereby corrected as shown below:

In Claim 1 (column 4) at line 17, delete "cut" and insert --form a single line cut in-- between "to" and "said".

Signed and sealed this 1st day of January 1974.

(SEAL)
Attest:

EDWARD M. FLETCHER, JR.      RENE D. TEGTMEYER
Attesting Officer             Acting Commissioner of Patents